United States Patent [19]
Jones

[11] 4,215,603
[45] Aug. 5, 1980

[54] BRAKE DRUM TURNING MACHINE

[75] Inventor: Robert P. Jones, Warren, Mich.

[73] Assignee: F. Jos. Lamb Company, Warren, Mich.

[21] Appl. No.: 925,448

[22] Filed: Jul. 17, 1978

[51] Int. Cl.$^2$ .......................... B23B 5/02; B23B 5/24; B23B 5/44
[52] U.S. Cl. ......................................... 82/1.3; 82/1 C; 82/1.4; 82/2 E; 82/4 A; 82/19; 82/24 A
[58] Field of Search ................. 82/4 A, 2 A, 2 E, 19, 82/1 C, 24 A, 1.3, 1.4

[56] References Cited
U.S. PATENT DOCUMENTS

| | | | |
|---|---|---|---|
| 2,720,806 | 10/1955 | Stewart | 82/18 |
| 3,010,344 | 11/1961 | Christensen | 82/24 A |
| 3,391,586 | 7/1968 | Van Den Kieboom | 82/18 |

*Primary Examiner*—Leonidas Vlachos
*Attorney, Agent, or Firm*—Barnes, Kisselle, Raisch & Choate

[57] ABSTRACT

A machine for machining brake drums wherein the cutting tool is cyclically retracted axially on its rotating spindle at a rate corresponding to the axial feed rate of the spindle and then quickly advanced on the spindle to the same extent so that the tool marks on the machined surface comprise a series of circular, rather than helical, grooves with relatively short, axially inclined grooves connecting the successive circular grooves.

19 Claims, 10 Drawing Figures

BRAKE DRUM TURNING MACHINE

This invention relates to metal turning machines, and, more specifically, to a machine for finish machining the inner cylindrical friction surface of a brake drum.

In the past it has been common practice in the manufacture of brake drums to first machine the friction surface of the drum by a conventional turning operation and then hone or grind the turned surface to remove the machining marks. The presence of helical screw thread-like machining marks left by a conventional turning tool are undesirable on a brake drum. The undesirability of the helical or spiral tool marks on these friction surfaces is due to the fact that when these tool marks come in contact with the lining of the brake shoe they produce an action similar to a nut turning on a screw. The kinetics of this action produces forces which tend to urge the brake shoe axially inwardly or outwardly from its intended location on the drum. Obviously, these forces are not the normal forces that a braking mechanism is designed to counteract. If these forces are allowed to occur, they can cause mechanical damage or otherwise impair the proper functioning of the brake mechanism.

The primary object of this invention is to turn the metal frictional surface of a brake drum without the necessity of a subsequent grinding or honing operation. The present machine accomplishes this by generating in a continuous manner a series of axially spaced grooves on the inside diameter of the brake drum which are of substantially circular, rather than helical, configuration.

A still further object of the invention resides in the provision of a mechanism for retracting the turning tool from the finished machined surface in a manner that eliminates the spiral tool drag-out mark from the machined surface when the tool is removed from the workpiece.

Other objects, features and advantages of the present invention will become apparent from the following description and accompanying drawings, in which.

Figure 5:
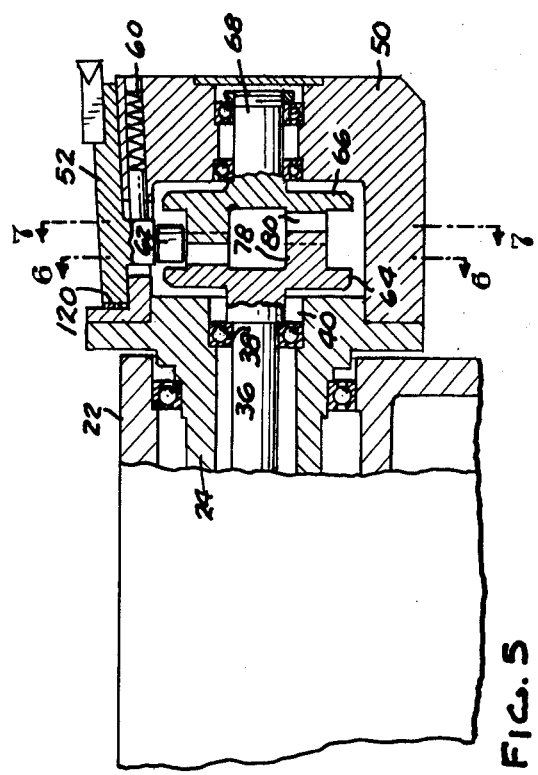
FIG. 5 is a fragmentary sectional view similar to FIG. 4 showing the cutting tool in the retracted position.
Figure 10:
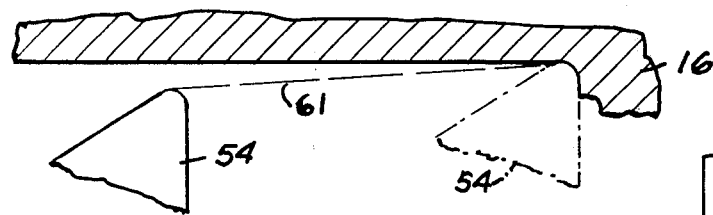
Figure 6:
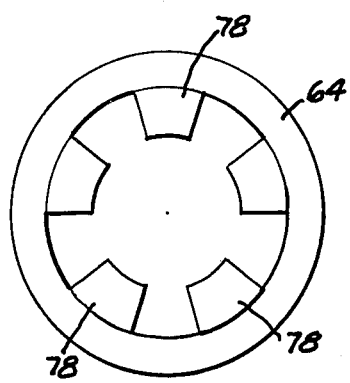
Figure 7:
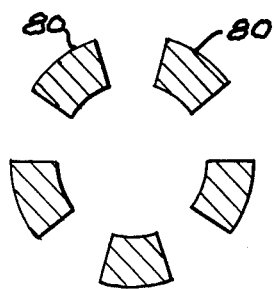
Figure 8:
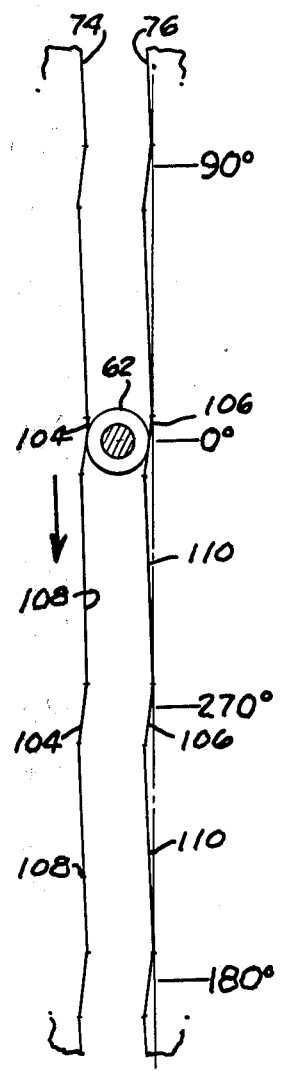
Figure 9:
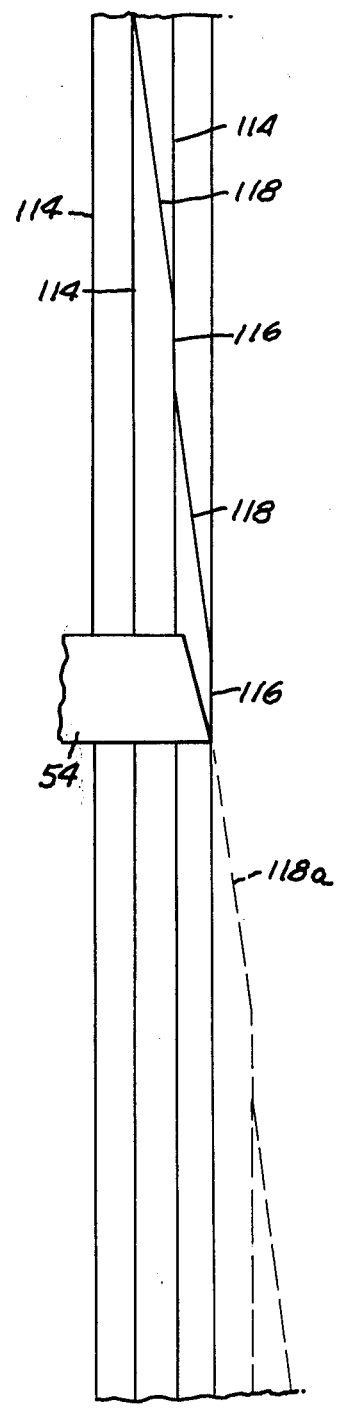

FIGS. 6 and 7 are sectional views of the toothed clutch components which form the interlock between the two cams in the head of the spindle and are taken along the lines 6—6 and 7—7, respectively, in FIG. 5;

FIG. 8 is a profile of the two cam faces laid out in the flat;

FIG. 9 is a diagrammatic view of the tool marks produced on the workpiece with the machine; and FIG. 10 is a sectional view illustrating the path of travel of the tool when it is retracted from the workpiece.

Figure 1:
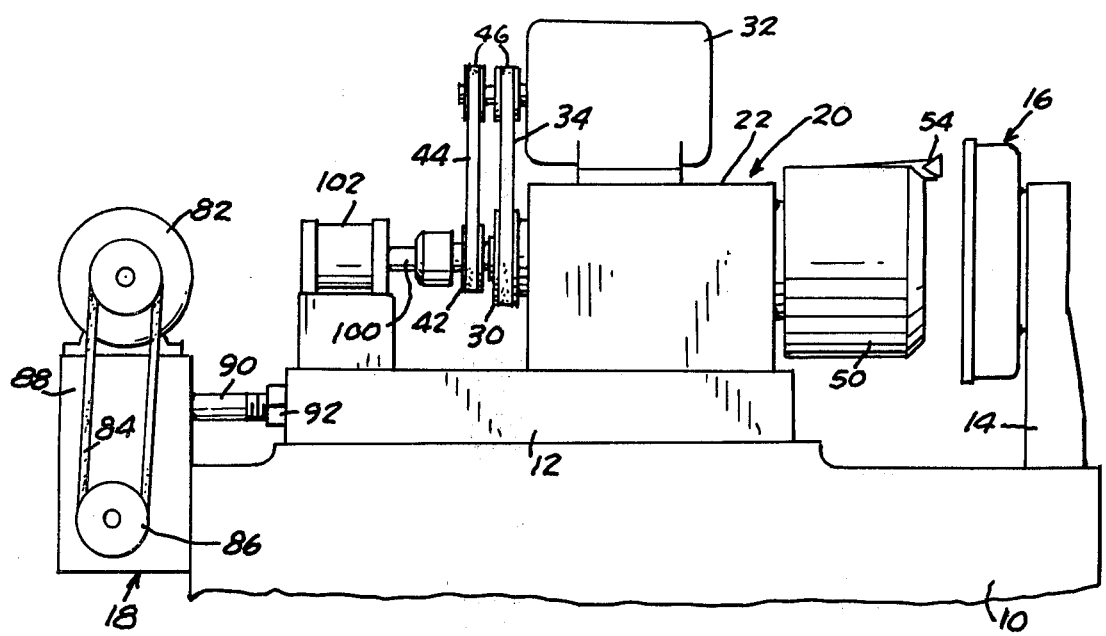
FIG. 1 is a side elevational view of a machine embodying the present invention.
Figure 2:
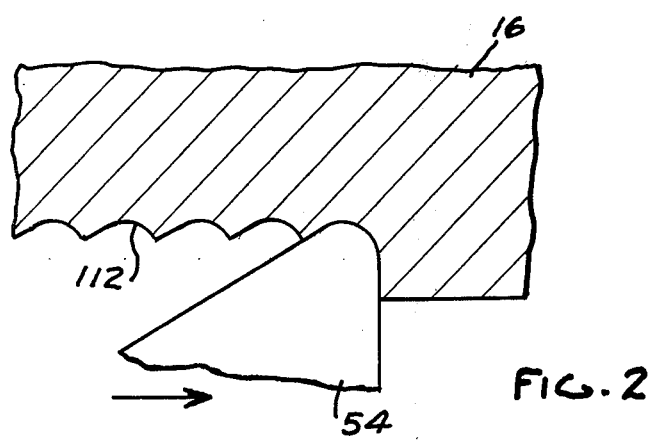
FIG. 2 is a greatly enlarged fragmentary sectional view of a workpiece machined in accordance with the present invention illustrating the tool marks formed thereon.
Figure 3:
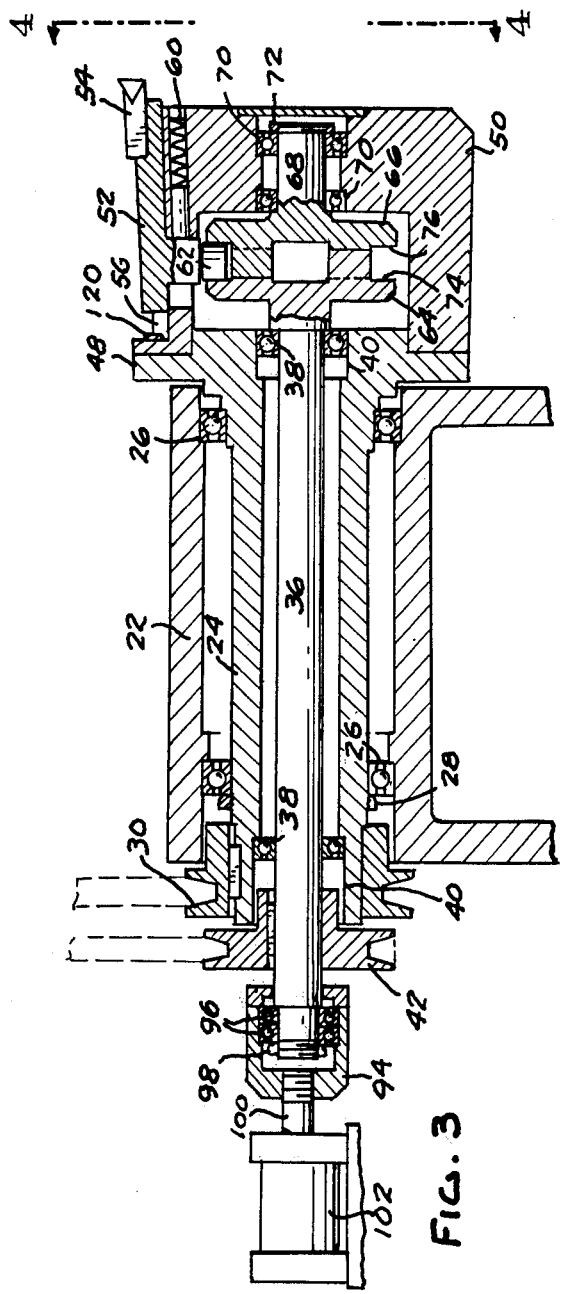
FIG. 3 is a fragmentary longitudinal sectional view of the spindle and tool assembly of the machine embodying the present invention.

Referring to FIGS. 1 and 3, the machine of the present invention generally includes a base 10 on which is slideably supported a slide 12. At one end of base 10 there is mounted a tool support 14 adapted to support a brake drum 16 to be machined. At the opposite end of base 10 there is mounted a slide feed assembly 18. A spindle assembly 20 is mounted on slide 12 for movement therewith. Spindle assembly 20 includes a housing 22 in which a spindle shaft 24 is journalled by means of bearings 26. Shaft 24 is locked axially within housing 22 by a nut 28. At one end thereof spindle shaft 24 has a pulley 30 keyed thereto. The spindle shaft is rotated by a motor 32 through a belt 34 which engages pulley 30.

Spindle shaft 24 is hollow and a second axially extending shaft 36 is supported for rotation therein by bearings 38. Bearings 38 are fixed axially to shaft 36 and are adapted to slide axially in the counterbores 40 at the opposite ends of spindle shaft 24. A pulley 42 is keyed to shaft 36 and is driven by motor 32 through a belt 44. It will be noted that pulley 42 is of smaller diameter than pulley 30 and, since the pulleys 46 on the shaft of motor 32 are of the same diameter, shaft 36 will be rotated at a higher speed than spindle shaft 24.

Figure 4:
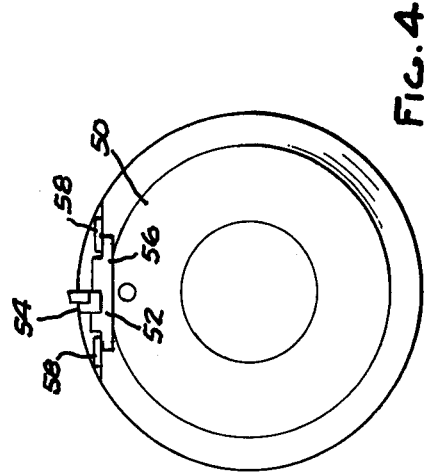
FIG. 4 is a view taken along the line 4—4 in FIG. 3.

The end of spindle shaft 24 opposite pulley 30 is formed with a flange 48 on which a spindle head 50 is mounted to rotate with spindle shaft 24. A tool slide 52 which supports a cutting tool 54 is mounted for axial oscillation on head 50 within an axial slot 56. Slide 52 is retained within slot 56 by a pair of gib members 58 (FIG. 4) and is biased in a direction to the left as viewed in FIG. 3 by a spring 60. Slot 56 is inclined slightly to the axis of the spindle such that, when it is shifted to the left within slot 56, it is retracted along the broken line 61 illustrated in FIG. 10.

A cam roller 62 is supported on the underside of tool slide 52 with its axis extending radially of the spindle. Roller 62 comprises a cam follower disposed between two cam plates 64,66. Cam plate 64 is formed integrally with shaft 36 at one end thereof. Cam plate 66 is formed on the end of a stub shaft 68 which is journalled in head 50 by bearings 70. Cam plate 66 and shaft 68 are fixed axially on head 50 by a nut 72. Cam plates 64,66 are formed with cam surfaces 74,76 on the mutually opposed faces thereof. Cam plates 64 is in driving engagement with cam plate 66 by means of interengaging clutch teeth 78,80 (FIGS. 6 and 7). The depth of the two sets of clutch teeth is such that, when interengaged, cam roller 62 can run between the two cam surfaces 74,76 with a slight clearance during a machining operation.

The feed mechanism 18 for shifting slide 12 axially on base 10 includes a motor 82 having a belt drive 84 with the input pulley 86 of a gear box assembly 88. The output shaft of gear box assembly 88 comprises a feed screw 90 in threaded engagement with a nut 92 on slide 12. During a machining cycle screw 90 is rotated at a predetermined speed to feed slide 12 to the right at a uniform rate.

Referring to FIGS. 1 and 3, the end of shaft 36 opposite cam plate 64 is connected to a thrust cap 94 by means of bearings 96 and a nut 98. Thrust cap 94 is in turn connected to the piston rod 100 of a cylinder 102. At the end of a machining cycle, before slide 12 is retracted, piston rod 100 is retracted to the left a short distance and cam plate 64 is correspondingly displaced. Tool 54 is likewise retracted along the line 61 under the bias of spring 60. Thereafter slide 12 is fully retracted by reversing feed mechanism 18 so that the tool clears the brake drum.

Referring now specifically to FIG. 8, the configuration of the cam surfaces 74,76 of cam plates 64,66 is shown laid out in the flat throughout approximately 360°. At an arbitrary point designated 0° there is shown a short uniform rise ramp 104 on cam surface 74 and a corresponding ramp 106 on cam surface 76. In the cams illustrated there are four of these short ramps spaced equally around the circumference of the cam plates. The successive short ramps 104,106 are interconnected by relatively long parallel ramps 108,110. Cam roller 62 is confined between these two sets of ramps with a minimum clearance. Thus, when cam plates 64,66 are rotated relative to spindle head 50, cutting tool 54 is positively displaced in axially opposite directions relative to the spindle without the aid of spring 60.

The differences in speed between spindle shaft 24 and inner shaft 36 is determined by the ratios of the two sets of driving pulleys and is selected in relation to the length and angularity of ramps 108,110 so that, when cam roller 62 is being displaced to the left by one of the cam ramps 110, the rate of axial travel of tool 54 will be equal to the rate of travel of slide 12 to the right as produced by feed assembly 18. This feed rate may be on the order of 0.010–0.015 inches per revolution of the tool. Thus, as cam roller 62 moves along the length of ramps 108,110, cutting tool 54 is retained in an axially fixed position and will cut a groove 112 in the workpiece which lies in a plane that is radial, rather than inclined, to the axis of the spindle. The successive circular paths of the cutting tool are designated 114 in FIG. 9. The difference in the rotational speeds between cam plates 64,66 and tool 54 and the number of ramps on the cam are selected so that each nonhelical machining cut or groove extends at least slightly beyond one revolution of the brake drum 16. This is illustrated by the short line 116 in FIG. 9 where the tool 54 is merely following the groove cut during the previous complete revolution of the spindle. The short line 116 may represent as little as 5°–10° of revolution of the cutting tool. When the tool reaches the end of the short line 116, cam roller 62 rolls into engagement with the short ramps 104,106.

When the short ramp 104 displaces cam roller 62 to the right, tool 54 will quickly advance to the right and then cut another circular groove. The rapid advance of the tool to the right is illustrated by the lines 118 which extend angularly between the machining lines 114. In the arrangement shown in FIG. 9 the next advance increment of the tool will be along the broken line 118a.

By proportioning the length and pitch of cam ramps 108,110 so that the tool is axially fixed for at least slightly more than one revolution, the short lines of advancement 118 between successive circular grooves will be staggered uniformly around the interior of the brake drum and will not define a continuous thread-like spiral on the machined inner surface of the drum. As long as the ramps 104,106 are relatively short in comparison with the ramps 108,110, these advancement marks will represent a very small portion of the internal cylindrical surface of the brake drum as distinguished from the continuous helical tool mark produced when the brake drum is machined in a conventional manner. When the brake lining contacts the grooved surface of the drum the forces tending to displace it axially because of the advancement grooves 118 will be relatively slight and will be overcome by the substantially greater stabilizing forces on the lining generated by the circular grooves 112. However, after a small number of braking applications (perhaps as little as 100 or 200), all of the tool marks will be worn off of the machined surface of the brake drum and this surface will then be in a prime condition for the remainder of its useful life.

When the cutting tool has advanced to the axially inner end of the cylindrical braking surface on the drum, cylinder 102 is actuated to retract shaft 36 and cam plate 64. Thus, as shown in FIG. 10, the tool is retracted on the head 50 under the bias of spring 60 along the path designated 61 inclined toward the axis of rotation until the rear end of the tool holder contacts a rest button 120 at the inner end of slot 56 (FIG. 5). The angle of inclination of the retraction stroke of the tool is such as to avoid any substantial interference of the tool with the previously machined surface. As shown in FIG. 5, the fully retracted position of shaft 36 and cam plate 64 is determined by the abutment of bearing 38 at the right with the shoulder of counterbore 40 in which it is slidably arranged. After the tool has been retracted so as to clear the previously machined surface, the direction of rotation of motor 82 of feed mechanism 18 is reversed to thus retract slide 12 and the tool assembly supported thereon away from the machined brake drum 16. Thereafter, cylinder 102 is again actuated to shift shaft 36 to the right to the position shown in FIG. 3 wherein the cam plates 64,66 and the spindle assembly as a whole are positioned to initiate machining of the next brake drum.

In the embodiment described and shown four sets of ramps on the cam plates are utilized. This represents a convenient arrangement, but more or less ramps may be employed. When the cam plates employ four sets of ramps, shaft 36 rotates at a speed approximately three-quarters the speed of rotation of spindle shaft 24. In other words, in the preferred embodiment during slightly more than one revolution of head 50 cam plates 64,66 rotate through slightly less than three-quarters of a revolution. If three sets of cam ramps are employed instead of four, then the pulleys 30,42 would be dimensioned so that shaft 36 rotates at a speed approximately two-thirds the speed of spindle shaft 24. In any event, the extent of rise and fall of each set of cam ramps is determined relative to the speed differential between shafts 24 and 36 so that when the cam roller traverses a set of the longer ramps the tool is retracted at a rate approximately equal to the feed rate of the spindle as produced by the feed mechanism 18.

I claim:

1. A machine for machining an axially extending surface of revolution on a workpiece so that the machining marks will be essentially circular rather than helical comprising, a support, a rotatable spindle movable axially on said support, means for rotating said spindle, means for supporting a workpiece so that the surface to be machined is coaxial with the spindle, a cutting tool mounted to rotate with said spindle and shiftable axially on the spindle, means for advancing said spindle axially in the feed direction at a predetermined rate during each machining cycle of the machine, means operative during said machining cycle for cyclically retracting the tool axially on the spindle in the opposite direction and at substantially the same rate as the spindle feed during a time period corresponding to at least one revolution of the spindle; and means operative following each cycle of operation of said cyclically operative means for shifting the tool on the spindle in the feed direction to the same extent during a time period corresponding to substantially less than one revolution of the spindle.

2. A machine as called for in claim 1 wherein the means for shifting the tool in the feed and retraction directions relative to the spindle comprise a cam means.

3. A machine as called for in claim 2 wherein said cam means comprises a cam concentric with and rotatable relative to said spindle.

4. A machine as called for in claim 3 including means for rotating said cam at a different speed from the speed of said spindle.

5. A machine as called for in claim 4 wherein the cutting tool is mounted on a tool slide shiftable axially on said spindle and including a cam follower operably connecting the tool slide and said cam.

6. A machine as called for in claim 2 wherein said spindle is rotatable relative to said cam means and cam follower means operatively connecting said tool and cam means for reciprocating the tool on the spindle in response to relative rotation between the spindle and cam means.

7. A machine as called for in claim 1 wherein said cyclically operative means are mounted on the spindle.

8. A machine as called for in claim 1 wherein said cyclically operative means comprises a cam, said spindle being rotatable relative to said cam, said cam having a peripheral cam track concentric with said spindle, said cam track having circumferentially extending ramp means thereon inclined axially to the spindle and a cam follower operatively connected with said tool and engaging said cam track.

9. A machine as called for in claim 8 wherein said ramp means comprises a first ramp inclined axially in one direction to a radial plane and a second ramp circumferentially contiguous to the first ramp, said second ramp being of substantially smaller arcuate extent than the first ramp and being inclined in the opposite direction at a substantially greater angle to said radial plane, the starting point of said first ramp and the ending point of the second ramp lying in the same radial plane.

10. A machine as called for in claim 9 including means for rotating the cam at a uniform speed different from the speed of rotation of the spindle, the speed ratio between the spindle and the cam being such that the spindle rotates through at least one revolution as the cam follower traverses the arcuate extent of the first ramp.

11. A machine as called for in claim 10 wherein the arcuate extent of the second ramp is such that the spindle rotates through substantially less than one revolution as the cam follower traverses the arcuate extent of the second ramp.

12. A machine as called for in claim 11 wherein the arcuate extent of the first ramp is such that the spindle rotates through more than one revolution as the cam follower traverses the arcuate extent thereof.

13. A machine as called for in claim 11 wherein said cam has a plurality of said first and second ramps spaced uniformly around the periphery thereof.

14. A machine as called for in claim 2 wherein the tool is mounted on a slide adapted to reciprocate axially on the spindle at an angle to the axis of the spindle such that the tool is displaced radially relative to the spindle axis and away from the surface of the workpiece being machined when the tool slide is retracted on the spindle and means for retracting the tool slide on the spindle through a distance many times greater than the displacement of the tool produced by said cam means.

15. A machine for machining an axially extending surface of revolution on a workpiece so that the machining marks will be essentially circular rather than helical comprising a support, a rotatable spindle movable axially on said support, means for rotating said spindle at a predetermined speed, means for supporting a workpiece so that the surface to be machined is coaxial with the spindle, a cutting tool mounted to rotate with said spindle and shiftable axially of the spindle, means for advancing said spindle axially in the feed direction at a predetermined rate during each machining cycle of the machine, cam means journalled on said spindle for rotation about the axis of the spindle, means for rotating said cam means at a predetermined speed different from the speed of rotation of the spindle, said cam means having a circumferentially extending cam track thereon, a cam follower operatively connecting said tool and cam track for reciprocating the tool axially on the spindle in response to relative rotation between the spindle and cam means, said cam track having a first ramp thereon inclined to a radial plane at a predetermined angle throughout its arcuate extent such that, when the cam means and spindle are rotated relative to each other, the cam traverses said ramp, the arcuate extent and the inclination of said ramp being such that when the cam means and spindle are rotated at their predetermined speeds the cam follower traverses said ramp and retracts the tool on the spindle at substantially the same rate as the spindle is advanced in the feed direction for a period corresponding to at least one revolution of the spindle, said cam track having a second ramp thereon circumferentially contiguous to said first ramp, the second ramp having a substantially shorter arcuate extent than the first ramp, the starting point of the first ramp and the ending point of the second ramp lying in the same radial plane, the arcuate extent of the second ramp being such that when the cam means and spindle are rotated at their respective predetermined speeds the cam follower traverses the second ramp for a period of time corresponding to only a small fraction of one revolution of the spindle.

16. A machine as called for in claim 15 wherein said cam means are provided with a plurality of said first and second ramps successively arranged around the entire periphery thereof.

17. A machine as called for in claim 15 wherein said cam means comprises a pair of plate cams driven in unison, said cam track being defined by the mutually opposed faces of said plate cams, said cam follower being disposed between the opposed faces of the plate cams.

18. A machine as called for in claim 15 wherein the path of reciprocation of the tool on the spindle is inclined radially to the axis of the spindle so that when the tool is retracted on the spindle it is displaced radially towards the axis of the spindle and means for displacing said cam means axially on the spindle to permit the tool to retract on the spindle through a distance many times greater than the displacement of the tool by said ramps.

19. A machine as called for in claim 17 including means for moving one of said cam plates away from the other cam plate through a distance substantially greater than the displacement of the tool by said ramps and means biasing said tool to retract on the spindle when said one cam plate is shifted axially away from the other, the path of reciprocation of the tool on the spindle being inclined to the axis of the spindle so that when the tool is retracted on the spindle it is displaced radially toward the axis of the spindle.

* * * * *